June 3, 1941. K. MILLER 2,244,169
CLUTCH
Filed Sept. 5, 1939 2 Sheets-Sheet 1
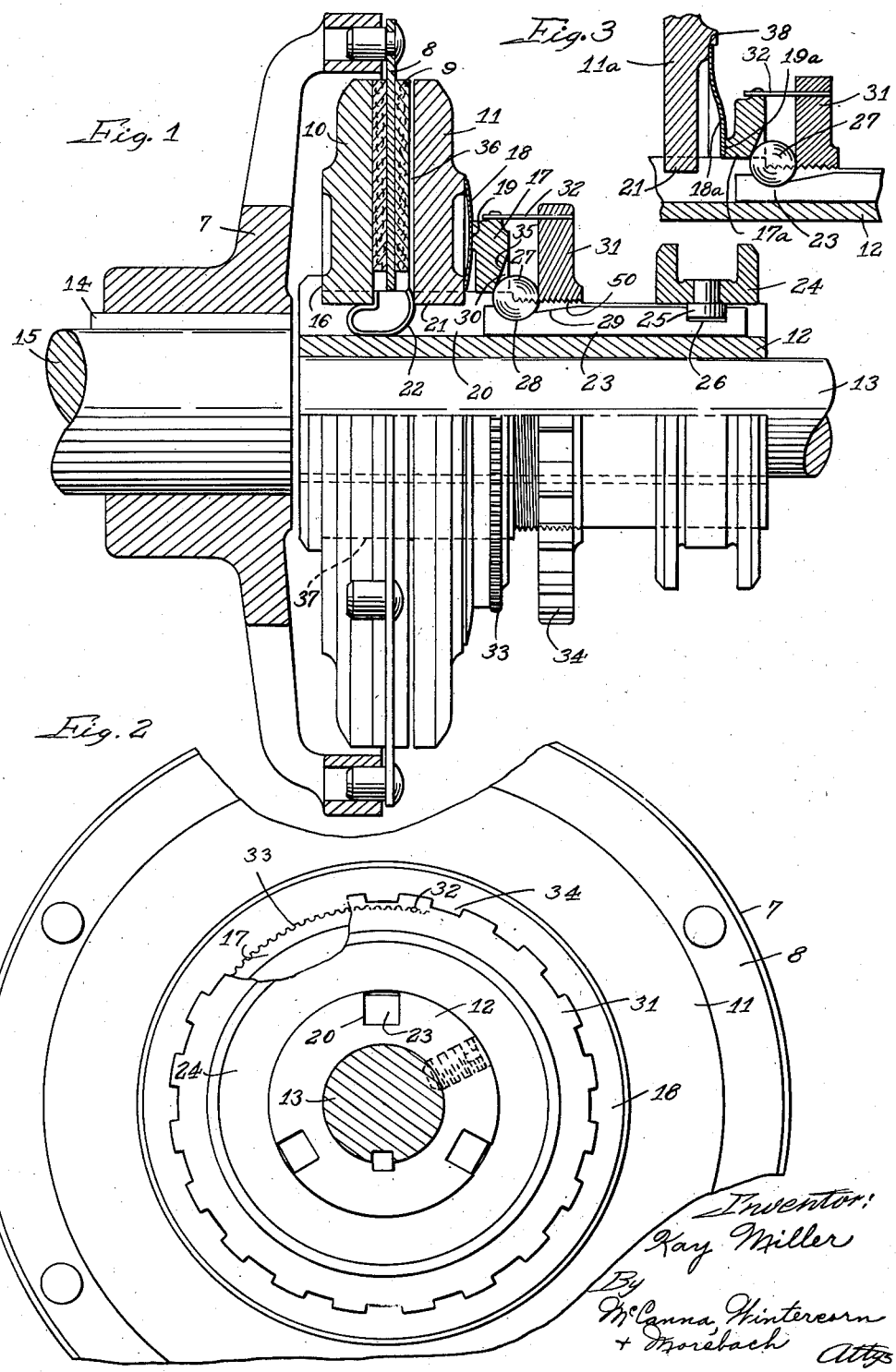

June 3, 1941.　　　　K. MILLER　　　　2,244,169
CLUTCH
Filed Sept. 5, 1939　　　　2 Sheets-Sheet 2
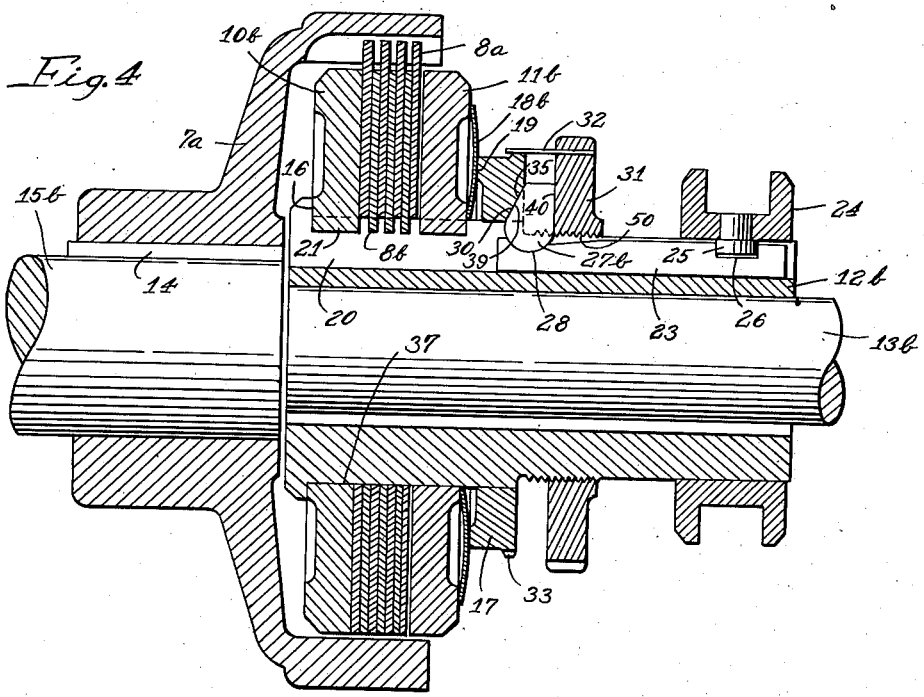
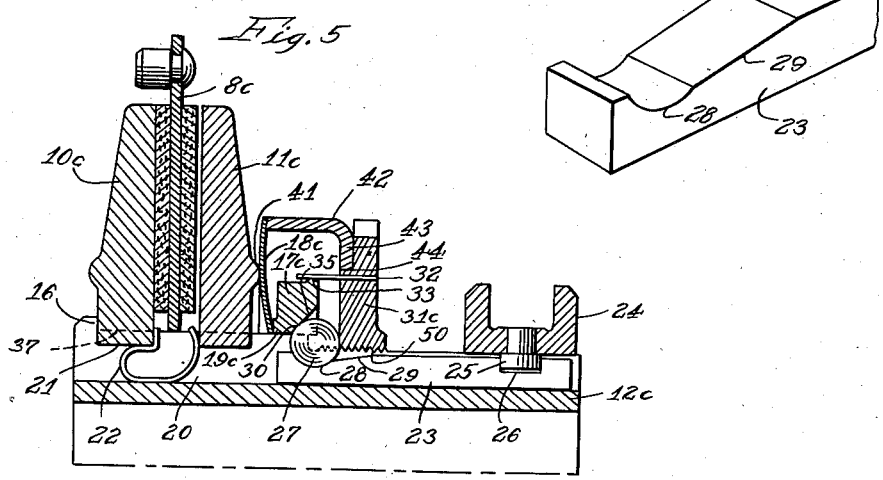
Inventor:
Kay Miller
By
McCanna, Wintercorn & Morebach
Attys.

Patented June 3, 1941

2,244,169

UNITED STATES PATENT OFFICE 2,244,169

CLUTCH

Kay Miller, Rockford, Ill., assignor to The Atwood Vacuum Machine Company, a copartnership composed of Seth B. Atwood and James T. Atwood, both of Rockford, Ill.

Application September 5, 1939, Serial No. 293,363

23 Claims. (Cl. 192—68)

This invention relates to friction clutches.

Various designs of positive engagement type clutches have been proposed, but so far as I am aware there has been no satisfactory solution to the problem in that type of clutch of properly compensating for wear on the friction surfaces to minimize slippage. It is therefore the principal object of my invention to provide a positive engagement type clutch embodying spring means to compensate for wear of the mats and give substantially uniform engaging pressure throughout an appreciable range.

Another object is to provide in a clutch of the kind mentioned an improved wear take-up adjustment, which, although it can be operated quickly and easily, is so constructed that there is no danger of the clutch accidentally changing its adjustment.

Still another object is to provide a clutch of the kind mentioned having improved engaging means.

The invention is illustrated in the accompanying drawings, in which—

Fig. 1 is a longitudinal section through a clutch made in accordance with my invention;

Fig. 2 is a rear view with portions broken away to permit showing the clutch on a larger scale and with another portion broken away to better illustrate the construction;

Fig. 3 is a fragmentary sectional detail illustrating a modified or alternative construction along the lines of Fig. 1;

Fig. 4 is a view similar to Fig. 1, showing still another construction in a multiple disk clutch;

Fig. 5 is a fragmentary sectional detail showing still another construction along the lines of Fig. 1, and Fig. 6 is a fragmentary perspective view of the cam end of one of the slidable keys forming part of the engaging means.

Similar reference numerals are applied to corresponding parts throughout the views.

Referring first to Figs. 1 and 2, 7 is the flywheel carrying a driving disk 8 provided with mats 9 for engagement with plates 10 and 11 splined on the driven member 12 keyed to and turning with the driven shaft 13. The flywheel 7 is keyed, as at 14, to the driving shaft 15. The plate 10 engages an annular shoulder 16 on the driven member 12 and the plate 11 is arranged to be moved toward the plate 10 by a collar 17 through the medium of an annular convex cushioning spring 18 carried on the plate 11 and engaged by the annular bead 19 on the collar 17. A plurality of longitudinal keyways 20 are provided in the outer periphery of the driven member 12 to receive the spline portions 21 on the plates 10 and 11 and also to provide channels to accommodate generally C-shaped leaf-type retracting springs 22 tending normally to force the plates 10 and 11 apart. As indicated in Fig. 2, there are three of these keyways 20 in equally circumferentially spaced relation, and three keys 23 are slidable in these keyways by means of a collar 24, the collar having studs 25 projecting radially inwardly therefrom and entered in transverse grooves 26 in the outer ends of the keys 23. Three cylindrical rollers 27 are provided, one for each key 23, and, as indicated in Fig. 3, fit in rounded transverse depressions 28 in the forward ends of the keys 23 in front of inclined cam surfaces 29. These rollers are held against sidewise displacement in the keyways 20 and also engage in notches 30 provided in the back of the collar 17, thereby causing the collar to turn with the driven member 12. An adjusting ring 31 is threaded, as at 50, on the driven member 12 and provides an abutment for the rollers 27 when the keys 23 are moved forwardly, forcing the rollers 27 radially outwardly for engagement of the clutch. The adjusting ring 31 is locked in adjusted relation to the collar 17 by means of a spring wire 32 projecting forwardly from the ring 31 and engaging the finely toothed periphery 33 of the collar 17. The periphery of the adjusting ring 31 is notched, as indicated at 34, to facilitate manual adjustment thereof, and it is obvious that the spring 32 in such adjustment can be flexed out of engagement with the teeth 33 on the collar 17, and the collar 17 will be held against turning during the adjustment by the key action of the rollers 27 in the notches 30.

In operation, the collar 24 is moved forward for engagement of the clutch, thereby causing the rollers 27 to be forced outwardly as they ride up the inclined cam surfaces 29 on the keys 23. In this outward movement, the rollers 27 ride along the inclined bottom surfaces 35 of the notches 30 in the collar 17, thereby forcing the collar 17 to move forward and compress the spring 18 for engagement of the clutch under spring pressure. In the initial movement of the keys 23, as the rollers 27 ride out of the depressions 28, there is an abrupt movement of the collar 17 sufficient to take up the clearance indicated at 36, and thereafter as the rollers 27 ride on the inclined surfaces 29, the spring 18 is compressed and the engaging pressure is gradually built up. The spring 18 functions to compensate for wear of the mats 9 to give substantially uniform engaging pressure throughout an appreciable range. Obviously the clutch should be adjusted periodically according to the amount of service, so as to keep well within the range of deflection of the spring 18. A quarter turn or so of the ring 31 will ordinarily compensate for the wear that occurred on the mats 9 since the previous adjustment.

In place of the convex spring 18 which is piloted on the large cylindrical end portion 37 of the driven member 12, I may, as shown in Fig. 3, provide an annular piloting shoulder 38 on the back of the plate 11a and mount a Belleville spring washer 18a on the shoulder 38 by its outer marginal edge portion, the inner marginal edge portion being arranged for engagement by the annular bead 19a on a collar 17a operable by means of rollers 27 and keys 23 similarly as the collar 17 in Fig. 1. A Belleville washer has the advantage of maintaining more nearly constant spring pressure throughout an appreciable range of deflection, so that there is less variation in the engaging pressure with this construction. It is understood that the clutch of Fig. 3 is otherwise identical with the clutch of Fig. 1 and is operated and adjusted similarly.

The clutch of Fig. 4 is of a multiple disk type having driving disks 8a carried on the rim of the flywheel 7a and cooperating with driven disks 8b carried on and turning with the driven member 12b. The plates 10b and 11b on the driven member 12b are arranged to force the driving and driven disks into engagement to transmit drive from the driving shaft 15b to the driven shaft 13b. In this clutch, the annular convex spring 18b similarly to the spring 18 of Fig. 1 is piloted on the enlarged cylindrical end portion 37 of the driven member and is engaged at the middle thereof by the annular bead 19 on the collar 17. The latter has notches 30 similarly as the collar 17 of Fig. 1, the inclined bottoms 35 of which are arranged to have surface contact with the inclined forward faces 39 of slidable wedges 27b which have semi-cylindrical enlarged inner ends fitting in the transverse depressions 28 in the inner ends of keys 23 slidable in the keyways 20. The wedges 27b, of course, take the place of the cylindrical rollers 27 in the clutches of Figs. 1 and 3, and they have the flat back faces 40 thereof slidably engaging the flat front face of the adjusting ring 31 that is threadedly mounted on the driven member 12b, as indicated at 50, and has a spring wire 32 projecting therefrom to engage the finely toothed periphery 33 of the collar 17. The wedges 27b obviously keep the collar 17 keyed to the driven member 12b by reason of engagement in the keyways 20 and notches 30. They also function to force the collar 17 forwardly when they are moved outwardly by forward movement of the keys 23. The surface contact between the wedges 27b and the collar 17 and ring 31 in contradistinction to the line contact between the rollers 27 and the related parts of the clutches of Figs. 1 and 3 makes for less wear and longer life. This variation in design is particularly important in a multiple disk clutch where the engaging pressure is ordinarily greater than in a single disk clutch.

The clutch of Fig. 5 is similar to those shown in Figs. 1 and 4 in so far as it also utilizes an annular convex spring 18c generally similar to the springs 18 and 18b of Figs. 1 and 4, respectively, but the spring 18c is reversed in relation to the plate 11c and collar 17c. The plate 11c has an annular bead 41 provided thereon to engage the middle or high point of the convex spring 18c and the latter is piloted on the enlarged cylindrical end portion 37 of the driven member 12c and is arranged to be engaged at its inner marginal edge portion by the annular bead 19c on the collar 17c and along its outer marginal edge portion by the forwardly bent annular flange 42 of a ring 43 mounted in concentric relation with the adjusting ring 31c on the annular shoulder 44 thereon. The plate 11c cooperates with another plate 10c to transmit drive from the disk 8c to the driven member 12c similarly as in the clutch of Fig. 1, and these plates are arranged to be urged apart by means of C-shaped leaf springs 22 in a similar manner. The collar 17c is actuated similarly as the collar 17 in Fig. 1 by keys 23 and rollers 27 working in the keyways 20 under the control of a collar 24. The rollers 27 work in the notches 30 in the collar 17c to force the collar forwardly upon forward movement of the keys 23 and the collar 17c is arranged to be locked in adjusted relation to the ring 31c by means of a spring wire 32 engaging the finely toothed periphery 33 of the collar. The operation of this clutch and its adjustment is generally the same as the clutch of Fig. 1.

It is believed the foregoing description conveys a good understanding of the objects and advantages of my invention. The appended claims have been drawn with a view to covering all legitimate modifications and adaptations.

I claim:

1. In a friction clutch, driving and driven shafts, a driving member turning with the driving shaft, a driven member turning with the driven shaft and having one or more longitudinal grooves provided therein, frictionally engageable driving and driven discs turning with the driving and driven members, respectively, compressible spring means for resiliently forcing said discs into engagement, a collar slidable on the driven member toward said spring means to compress the same and having radial grooves provided on the rear face thereof registering with the aforesaid longitudinal grooves, an annular abutment on the driven member in longitudinally spaced relation to and behind said collar, tapered keys slidable in said longitudinal grooves, and clutch engaging members seated on the keys and projecting radially outwardly from the longitudinal grooves into said radial grooves between the collar and abutment, the radial grooves, abutment, and keys cooperating to provide two ratio means for wedging engagement therebetween of said clutch engaging members, the first ratio being for high ratio operation of said collar and the second ratio being for low ratio operation of said collar incident to forward movement of said keys, said keys in their first short forward movement causing a quick take-up of play and light engagement of the driving and driven discs, and said keys in the subsequent longer movement causing the discs to engage with increasing pressure in the gradual build-up of spring pressure on the discs due to gradual compression of the spring means.

2. In a friction clutch, driving and driven shafts, a driving member turning with the driving shaft, a driven member turning with the driven shaft and having one or more longitudinal grooves provided therein, frictionally engageable driving and driven discs turning with the driving and driven members, respectively, compressible spring means for resiliently forcing said discs into engagement, a collar slidable on the driven member toward said spring means to compress the same and having radial grooves provided on the rear face thereof registering with the aforesaid longitudinal grooves, an annular abutment on the driven member in longitudinally spaced relation to and behind said collar, tapered keys slidable in said longitudinal grooves, and clutch engaging members seated on the keys and projecting radially outwardly from the longitudinal grooves into said radial grooves between the collar and abutment, the keys having a two-angled taper so that the clutch engaging members are given abrupt outward movement in the initial slight forward movement of the keys to cause prompt clutch engagement, but thereafter the outward movement of the members is in a smaller ratio to the movement of the keys so as to build up spring pressure gradually on the discs.

3. In a friction clutch, driving and driven shafts, a driving member turning with the driving shaft, a driven member turning with the driven shaft and having one or more longitudinal grooves provided therein, frictionally engageable driving and driven discs turning with the driving and driven members, respectively, compressible spring means for resiliently forcing said discs into engagement, a collar slidable on the driven member toward said spring means to compress the same and having radial grooves provided on the rear face thereof registering with the aforesaid longitudinal grooves, an annular abutment on the driven member in longitudinally spaced relation to and behind said collar, tapered keys slidable in said longitudinal grooves, and clutch engaging members seated on the keys and projecting radially outwardly from the longitudinal grooves into said radial grooves between the collar and abutment, the keys being recessed transversely next to the tapered portions to receive the clutch engaging members in retracted relationship relative to said collar and abutment, the recesses being sufficient to cause abrupt outward movement of the clutch engaging members for prompt engagement of the clutch in the initial slight forward movement of the keys.

4. In a friction clutch, driving and driven shafts, a driving member turning with the driving shaft, a driven member turning with the driven shaft and having one or more longitudinal grooves provided therein, frictionally engageable driving and driven discs turning with the driving and driven members, respectively, compressible spring means for resiliently forcing said discs into engagement, a collar slidable on the driven member toward said spring means to compress the same and having radial grooves provided on the rear face thereof registering with the aforesaid longitudinal grooves, an annular abutment on the driven member in longitudinally spaced relation to and behind said collar, tapered keys slidable in said longitudinal grooves, and clutch engaging members seated on the keys and projecting radially outwardly from the longitudinal grooves into said radial grooves between the collar and abutment, said abutment being adjustably fixed on said driven member in spaced relation to the collar, so that an earlier relationship of said spring means to said discs may be reproduced after the latter become worn, by forward adjustment of said abutment.

5. In a friction clutch, driving and driven shafts, a driving member turning with the driving shaft, a driven member turning with the driven shaft and having one or more longitudinal grooves provided therein, frictionally engageable driving and driven discs turning with the driving and driven members, respectively, compressible spring means for resiliently forcing said discs into engagement, a collar slidable on the driven member toward said spring means to compress the same and having radial grooves provided on the rear face thereof registering with the aforesaid longitudinal grooves, an annular abutment on the driven member in longitudinally spaced relation to and behind said collar, tapered keys slidable in said longitudinal grooves, and clutch engaging members seated on the keys and projecting radially outwardly from the longitudinal grooves into said radial grooves between the collar and abutment, said abutment being threadedly mounted on said driven member for longitudinal adjustment toward and away from the collar, and means acting between the abutment and collar for releasably locking said abutment against rotation relative to said driven member.

6. In a friction clutch, a driven shaft, a sleeve splined thereon and formed with longitudinal grooves, wedges slidably mounted in said grooves, respectively, a clutch member operatively connected with said shaft and having a plurality of grooves formed therein with bottoms inclined at an acute angle to the axis of said shaft, engaging members in said grooves, respectively, arranged to be actuated by said wedges, a driving member, and manually operative means adapted to actuate said wedges into simultaneous engagement with said engaging members, whereby said engaging members force said clutch member into clutching frictional engagement with said driving member, each of said wedges being recessed next to the inclined surface thereon to receive and locate the engaging members in retracted position, said recesses being shallow enough to cause the engaging members to ride out onto the inclined surfaces of the wedges upon initial movement of the latter, but deep enough so that the abrupt movement of the clutch engaging members takes up substantially all of the play in the engagement of the clutch member and driving member.

7. In a friction clutch, a driven shaft, a sleeve splined thereon and formed with longitudinal grooves, a longitudinal wedge slidably mounted in each of said grooves, a clutch member rotatively and slidably connected with said shaft and having a surface inclined at an acute angle to the axis of said shaft and wedges, a plurality of cylindrical rollers positioned in said grooves, respectively, arranged to engage the inclined surface of said clutch member, a driving member adjacent said clutch member, and manually operative means adapted to simultaneously actuate said wedges into wedging engagement with said cylindrical rollers, respectively, whereby said clutch member is forced into driving engagement with said driving member, said wedges being recessed transversely next to the inclined surface thereof to provide detent seats for the rollers in retracted position, the construction providing abrupt movement of the rollers in the initial movement of the wedges and gradual movement of the rollers in the subsequent movement of the wedges.

8. In a friction clutch, a driven shaft, a sleeve splined thereon and formed with longitudinal grooves, a longitudinal actuating wedge slidably mounted in each of said grooves, a clutch member rotatively and slidably connected with said shaft and having a surface inclined at an acute angle to the axis of said shaft and wedges, a plurality of actuated wedge members positioned with the actuating wedges in said grooves, respectively, each actuated wedge member tapered outwardly from an enlarged inner end and having surface engagement on one face with the inclined surface on the clutch member, an abutment relative to which the clutch member is movable by said actuated wedge members and having surface engagement with the other face thereof, a driving member adjacent said clutch member, and manually operative means adapted to actuate said first wedges into wedging engagement with said second wedges, respectively, whereby said clutch member is forced into driving engagement with said driving member.

9. In a friction clutch, a driven shaft, a sleeve splined thereon and formed with longitudinal grooves, a longitudinal actuating wedge slidably mounted in each of said grooves, a clutch member rotatively and slidably connected with said shaft and having a surface inclined at an acute angle to the axis of said shaft and wedges, a plurality of actuated wedge members positioned with the actuating wedges in said grooves, respectively, a driving member adjacent said clutch member, and manually operative means adapted to actuate said first wedges into wedging engagement with said second wedges, respectively, whereby said clutch member is forced into driving engagement with said driving member, the first named wedges being recessed transversely next to the inclined surfaces thereof to provide detent seats for the inner ends of the second wedges in retracted position, the construction providing abrupt movement of the second wedges in the initial movement of the first wedges and gradual movement of the second wedges in the subsequent movement of the first wedges.

10. In a friction clutch, a driven shaft, a sleeve splined thereon and formed with longitudinal grooves, a longitudinal actuating wedge slidably mounted in each of said grooves, a clutch member rotatively and slidably connected with said shaft and having a surface inclined at an acute angle to the axis of said shaft and wedges, a plurality of actuated wedges in said grooves, respectively, the second named wedges tapering outwardly from enlarged semicylindrical inner ends and in their retracted position being adapted to fit in arcuate transverse recesses provided therefor in the first named wedges, a driving member adjacent said clutch member, and manually operative means adapted to actuate said first wedges into wedging engagement with said second wedges, respectively, whereby said clutch member is forced into driving engagement with said driving member.

11. In a friction clutch, driving and driven shafts, a driving member turning with the driving shaft, a driven member turning with the driven shaft and having one or more longitudinal grooves provided therein, frictionally engageable driving and driven discs turning with the driving and driven members respectively, an annularly bowed compressible spring ring surrounding the driven member for resiliently forcing said discs into engagement, a collar slidable on the driven member behind said ring and arranged to engage and compress the same, an annular abutment on the driven member in longitudinally spaced relation to and behind said collar, clutch actuating means slidable in said grooves, and other means slidable between the collar and said abutment and actuated by the last mentioned means to move the collar away from the abutment so as to engage the clutch and hold the same engaged under spring pressure of the compressed spring ring.

12. In a friction clutch, driving and driven shafts, a driving member turning with the driving shaft, a driven member turning with the driven shaft and having one or more longitudinal grooves provided therein, frictionally engageable driving and driven discs turning with the driving and driven members respectively, an annularly bowed compressible spring ring surrounding the driven member for resiliently forcing said discs into engagement, a collar slidable on the driven member having engagement with the inner peripheral edge portion of said spring ring, an annular abutment on the driven member in longitudinally spaced relation to and behind said abutment having an annular projection surrounding said collar and engaging the outer peripheral edge portion of said spring ring whereby said spring ring is adapted to be compressed to force the discs into engagement upon movement of the collar away from said abutment, clutch actuating means slidable in said grooves, and other means slidable between the collar and said abutment and actuated by the last mentioned means to move the collar away from the abutment so as to engage the clutch and hold the same engaged under spring pressure of the compressed spring ring.

13. A clutch as set forth in claim 12 wherein said abutment is threadedly mounted on said driven member for longitudinal adjustment toward and away from the collar, said clutch including means acting between the abutment and collar for releasably locking said abutment against rotation relative to said driven member.

14. In a friction clutch, driving and driven shafts, a driving member turning with the driving shaft, a driven member turning with the driven shaft and having one or more longitudinal grooves provided therein, frictionally engageable driving and driven discs turning with the driving and driven members respectively, an annular spring ring surrounding the driven member for resiliently forcing said discs into engagement, a collar slidable on the driven member having engagement with one peripheral edge portion of said spring ring, the other peripheral edge portion of said spring ring being arranged to exert spring pressure for resiliently forcing said discs into engagement, an annular abutment on the driven member in longitudinally spaced relation to and behind said collar, clutch actuating means slidable in said grooves, and other means slidable between the collar and said abutment and actuated by the last mentioned means to move the collar away from the abutment whereby to compress the spring ring to force the discs into engagement.

15. A clutch as set forth in claim 14 wherein said abutment is threadedly mounted on said driven member for longitudinal adjustment toward and away from the collar, said clutch including means acting between the abutment and collar for releasably locking said abutment against rotation relative to said driven member.

16. In a friction clutch, driving and driven shafts, a driving member turning with the driving shaft, a driven member turning with the driven shaft and having one or more longitudinal grooves provided therein, frictionally engageable driving and driven discs turning with the driving and driven members respectively, spring means for resiliently forcing said discs into engagement, a collar slidable on the driven member having engagement with said spring means, an annular abutment on the driven member in longitudinally spaced relation to and behind said collar, clutch actuating means slidable in said grooves, and other means slidable between the collar and said abutment and actuated by the last mentioned means to move the collar away from the abutment so as to compress said spring means and force the discs into engagement.

17. A clutch as set forth in claim 16 wherein said abutment is threadedly mounted on said driven member for longitudinal adjustment toward and away from the collar, said clutch including means acting between the abutment and collar for releasably locking said abutment against rotation relative to said driven member.

18. In a friction clutch, driving and driven shafts, a driving member turning with the driving shaft, a driven member turning with the driven shaft and having one or more longitudinal grooves provided therein, frictionally engageable driving and driven discs turning with the driving and driven members, respectively, a collar slidable on the driven member to force said discs into engagement having radial grooves provided on the rear face thereof remote from said discs registering with the aforesaid longitudinal grooves, an annular abutment on the driven member in longitudinally spaced relation to and behind said collar, tapered keys slidable in said longitudinal grooves, and clutch engaging members seated on the keys and projecting radially outwardly from the longitudinal grooves into said radial grooves between the collar and abutment, the radial grooves, abutment, and keys cooperating to provide two-ratio means for wedging engagement therebetween of said clutch engaging members, the first ratio being for high ratio operation of said collar and the second ratio being for low ratio operation of said collar incident to forward movement of said keys, said keys in their first short forward movement causing a quick take-up of play and light engagement of the driving and driven discs, and said keys in the subsequent longer movement causing the discs to engage with increased pressure.

19. In a friction clutch, driving and driven shafts, a driving member turning with the driving shaft, a driven member turning with the driven shaft and having one or more longitudinal grooves provided therein, frictionally engageable driving and driven discs turning with the driving and driven members, respectively, a collar slidable on the driven member toward said discs to cause driving engagement thereof and having radial grooves provided on the rear face thereof remote from the discs, registering with the aforesaid longitudinal grooves, an annular abutment on the driven member in longitudinally spaced relation to and behind said collar, tapered keys slidable in said longitudinal grooves, and clutch engaging members seated on the keys and projecting radially outwardly from the longitudinal grooves into said radial grooves between the collar and abutment, the keys having a two-angled taper so that the clutch engaging members are given abrupt outward movement in the initial slight forward movement of the keys to cause prompt clutch engagement but thereafter the outward movement of the members is in a smaller ratio to the movement of the keys for gradually increased pressure on the discs.

20. In a friction clutch, driving and driven shafts, a driving member turning with the driving shaft, a driven member turning with the driven shaft and having one or more longitudinal grooves provided therein, frictionally engageable driving and driven discs turning with the driving and driven members, respectively, a collar slidable on the driven member toward said discs to cause driving engagement thereof and having radial grooves provided on the rear face thereof remote from the discs registering with the aforesaid longitudinal grooves, an annular abutment on the driven member in longitudinally spaced relation to and behind said collar, tapered keys slidable in said longitudinal grooves, and clutch engaging members seated on the keys and projecting radially outwardly from the longitudinal grooves into said radial grooves between the collar and abutment, the bottoms of said radial grooves and the tops of said tapered keys both providing inclined surfaces at acute angles to one another and in acute angle relationship to the axis of the driving and driven shafts, one of the surfaces being a two-angled surface so that the collar in the movement of the clutch engaging members is given abrupt forward movement in the initial slight forward movement of the keys to cause prompt clutch engagement but thereafter the forward movement of the said collar is in a smaller ratio to the movement of the keys for gradually increased pressure on the discs.

21. In a friction clutch, a driven shaft, a sleeve splined thereon and formed with longitudinal grooves, a longitudinal actuating wedge slidably mounted in each of said grooves, a clutch member rotatively and slidably connected with said shaft and having a surface inclined at an acute angle to the axis of said shaft and wedges, a plurality of actuated wedge members positioned with the actuating wedges in said grooves, respectively, each actuated wedge member tapered outwardly from an enlarged inner end and having surface engagement on one face with the inclined surface on the clutch member, an abutment relative to which the clutch member is movable by said actuated wedge members and having surface engagement with the other face thereof, and manually operative means for actuating the first wedges whereby said clutch member is forced into driving engagement with the driving member, each actuating wedge having a two-angled taper so that the actuated wedge members are given abrupt outward movement in the initial movement of the actuating wedges but thereafter the outward movement of the actuated wedge members is in a smaller ratio to the movement of the actuating wedges, substantially as and for the purpose described.

22. A clutch as set forth in claim 11 wherein said abutment is threadedly mounted on said driven member for longitudinal adjustment toward and away from the collar, said clutch including means acting between the abutment and collar for releasably locking said abutment against rotation relative to said driven member.

23. In a friction clutch, driving and driven shafts, a driving member turning with the driving shaft, a driven member turning with the driven shaft and having one or more longitudinal grooves provided therein, frictionally engageable driving and driven discs turning with the driving and driven members respectively, an annularly bowed compressible spring ring surrounding the driven member for resiliently forcing said discs into engagement, said spring ring having engagement at its inner and outer peripheries with one of said discs to apply engaging pressure thereto, a collar slidable on the driven member behind said ring and having an annular portion annularly engaging the spring ring at an intermediate point between the inner and outer peripheries to compress said ring, an annular abutment on the driven member in longitudinally spaced relation to and behind said collar, clutch actuating means slidable in said grooves, and other means slidable between the collar and said abutment and actuated by the last mentioned means to move the collar away from the abutment so as to engage the clutch and hold the same engaged under spring pressure of the compressed spring ring.

KAY MILLER.